United States Patent [19]
Liu

[11] Patent Number: 5,939,713
[45] Date of Patent: Aug. 17, 1999

[54] OPTICAL SENSING SYSTEM USING TWO SENSORS TO GENERATE POSITION SIGNALS

[75] Inventor: Shu-Ming Liu, Taipei, Taiwan

[73] Assignee: Primax Electronics Ltd., Taipei Hsien, Taiwan

[21] Appl. No.: 08/963,478

[22] Filed: Nov. 3, 1997

[51] Int. Cl.$^6$ .................................................. G01D 5/347
[52] U.S. Cl. ............................... 250/231.14; 250/231.17
[58] Field of Search .................... 250/231.13, 231.14, 250/231.16, 231.17, 231.18, 237 G, 237 R

[56] References Cited

U.S. PATENT DOCUMENTS

| | | | |
|---|---|---|---|
| 4,661,696 | 4/1987 | Stone | 250/231.14 |
| 4,965,446 | 10/1990 | Vse | 250/231.14 |
| 5,003,170 | 3/1991 | Masuda et al. | 250/231.17 |
| 5,070,726 | 12/1991 | Fukui et al. | 250/231.18 |
| 5,396,063 | 3/1995 | Ito et al. | 250/231.18 |

*Primary Examiner*—David Nelms
*Assistant Examiner*—John R. Lee

[57] ABSTRACT

The present invention discloses an optical sensing system which utilizes two sensors to detect positioning holes or an identification hole of a grid panel. The optical sensing system comprises a wheeled shaped grid panel, a sensing device and a control circuit. The panel has a grid array installed in it, and the grid array comprises a plurality of positioning holes and an identification hole. The sensing device is used for detecting movements of the grid array in left and right directions. The sensing device comprises a light source located at one side of the panel for emitting light, and two sensors located at another side of the panel for detecting the light emitted from the light source through any hole of the grid array and generating corresponding sensing signals. The control circuit is connected to the two sensors for converting the sensing signals generated by the two sensors into corresponding position signals or displacement signals. The two sensors of the sensing device are arranged in a tilted pattern over which one sensor is positioned above the other in up and down direction and the two sensors are not overlapped in left and right direction. And the shape of the identification hole is made according to the tilted pattern of the two sensors so that when any positioning hole of the grid array passes through the sensing device in left or right direction, the two sensors will sequentially detect the light passed through the positioning hole, and when the identification hole of the grid array passes through the sensing device, the two sensors will detect the light passed through the identification hole in the same time.

7 Claims, 3 Drawing Sheets

OPTICAL SENSING SYSTEM USING TWO SENSORS TO GENERATE POSITION SIGNALS

BACKGROUND OF THE INVENTION

1. Field of the Invention

The present invention relates to an optical sensing system, and more particularly, to an optical sensing system which uses two sensors to generate position signals.

2. Description of the Prior Art

Please refer to FIG. 1. FIG. 1 is a perspective view of a prior art optical sensing system 10. The optical sensing system 10 is frequently used in stepping motors for calculating rotation number of a stepping motor. The system 10 comprises a grid panel 12 and a sensing device 14 for detecting rotations of the grid panel 12. The grid panel 12 has a grid array 16 having a plurality of positioning holes 18 and an identification hole 20 installed around the periphery of the panel 12. The identification hole 20 is longer than other positioning holes 18. The sensing device 14 comprises three optical sensors 22, 24, and 26 installed at one side of the grid array 16 for detecting movements of the grid array 16 in left and right directions and generating corresponding sensing signals, and a light source (not shown) installed at another side of the grid array 16 for emitting light.

The two sensors 22 and 24 are arranged in a left-and-right pattern. When a positioning hole 18 of the grid array 16 passes through the sensing device 14 horizontally, the two sensors 22 and 24 will sequentially detect the light passed through the positioning hole 18 and sequentially generate corresponding sensing signals. Based on these sequentially generated sensing signals, the optical sensing system 10 can determine how many holes have been rotated and the direction of the rotation, and then generates displacement signals according to the sensing signals.

The sensor 26 is used for detecting the identification hole 20. Since the grid panel 12 has only one identification hole 20, whenever the identification hole 20 is detected by the sensor 26, the optical sensing system 10 will know the position of the grid panel 12. By using the sensor 26 to detect the position of the grid panel 12 and the sensors 22 and 24 to detect displacement of the grid panel 12, the optical sensing system 10 can generate position signals to represent the position of the grid panel 12 at each specific moment.

The major drawback of the optical sensing system 10 is that it uses three sensors to detect the position of the grid panel 12 since a three-sensor detector is quite expensive.

SUMMARY OF THE INVENTION

It is therefore a primary objective of the present invention to provide an optical sensing system which uses two sensors to detect the position of a grid panel and generate corresponding position signals.

In a preferred embodiment, the present invention comprises an optical sensing system comprising:

a wheel-shaped grid panel having a grid array installed in it, the grid array comprising a plurality of positioning holes and an identification hole;

a sensing device for detecting movements of the grid array in left and right directions, the sensing device comprising a light source located at one side of the panel for emitting light, and two sensors located at another side of the panel for detecting the light emitted from the light source through any hole of the grid array and generating corresponding sensing signals; and a control circuit connected to the two sensors for converting the sensing signals generated by the two sensors into corresponding position signals or displacement signals;

wherein the two sensors of the sensing device are arranged in a tilted pattern over which one sensor is positioned above the other in up and down direction and the two sensors are not overlapped in left and right direction, and the shape of the identification hole is made according to the tilted pattern of the two sensors so that when any positioning hole of the grid array passes through the sensing device in left or right direction, the two sensors will sequentially detect the light passed through the positioning hole, and when the identification hole of the grid array passes through the sensing device, the two sensors will detect the light passed through the identification hole in the same time.

It is an advantage of the present invention that the optical sensing system requires only two sensors to detect the position of the grid panel.

This and other objectives and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
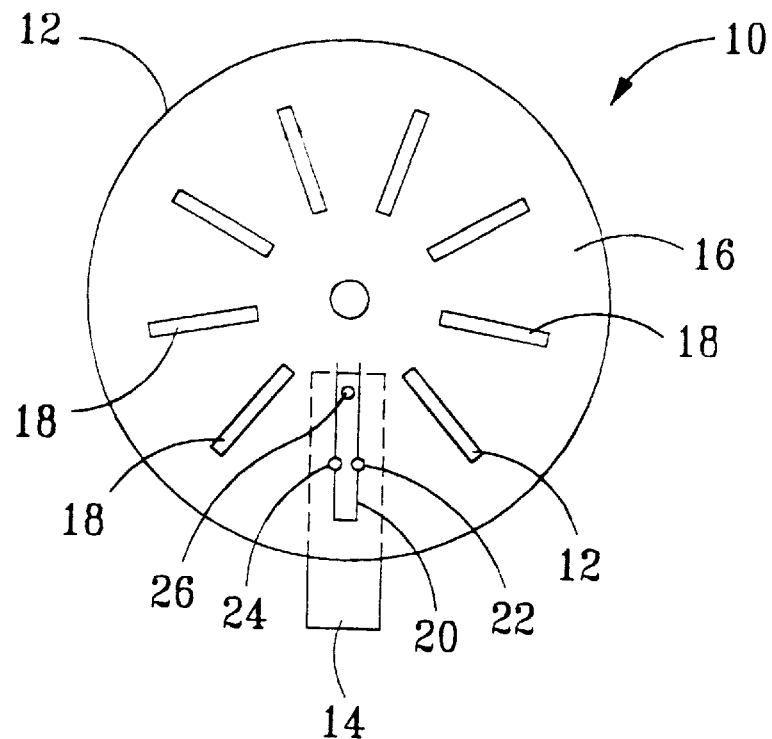
FIG. 1 is a perspective view of a prior art optical sensing system.
Figure 2:
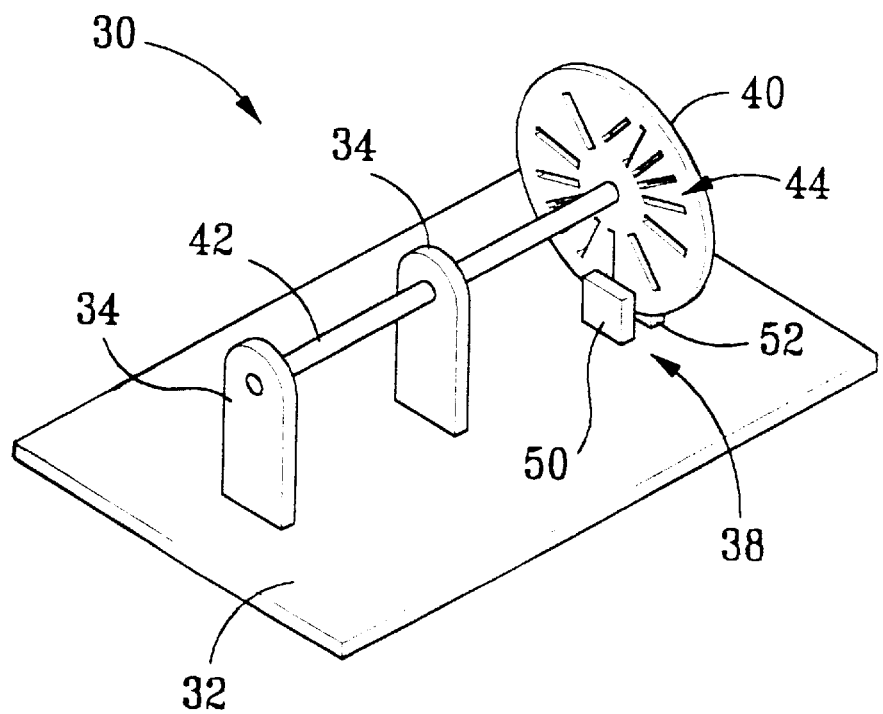
FIG. 2 is a perspective view of an optical sensing system according to the present invention.
Figure 3:
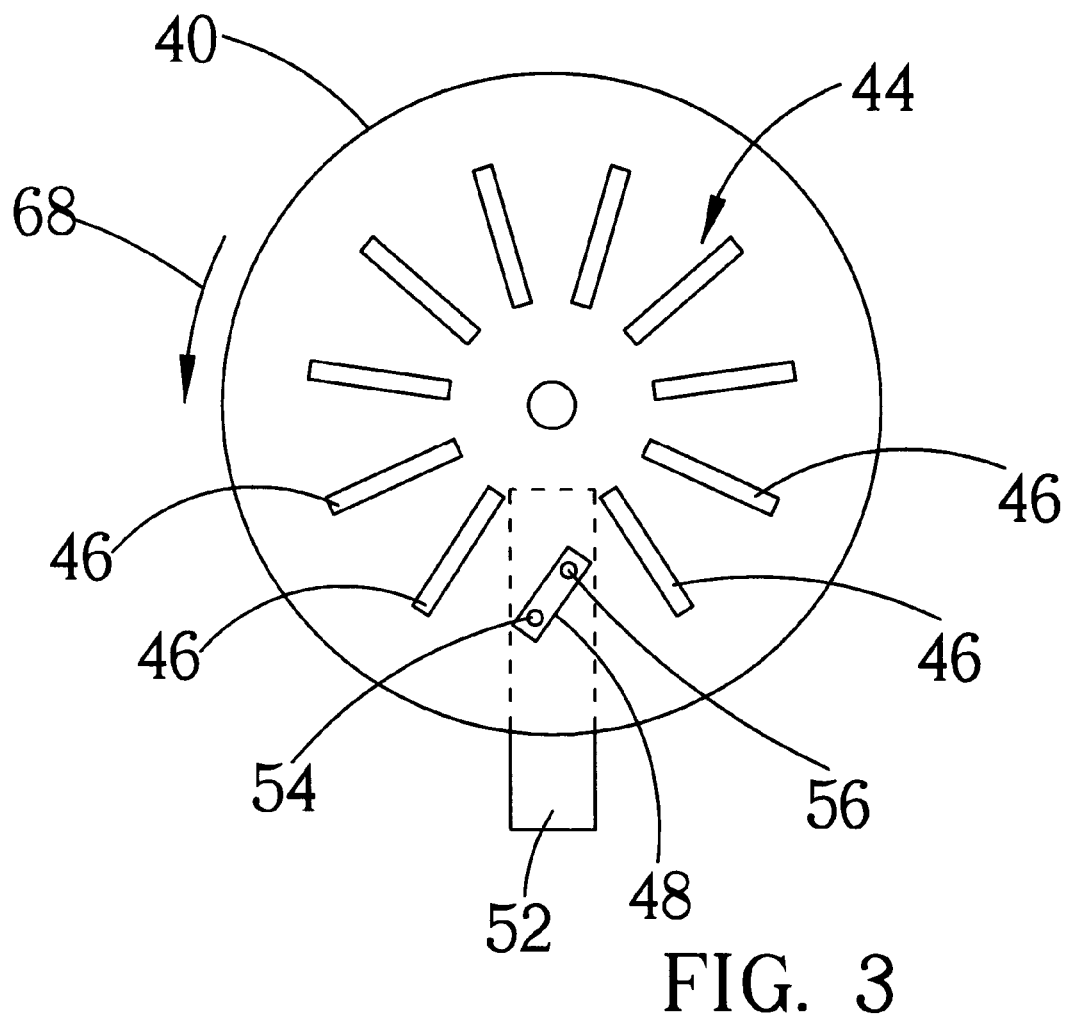
FIG. 3 is a perspective view of the grid panel and the optical detector of the sensing device shown in FIG. 2.

Please refer to FIG. 2 and FIG. 3. FIG. 2 is a perspective view of an optical sensing system 30 according to the present invention. FIG. 3 is a perspective view of the grid panel 40 and the optical detector 52 of the sensing device 38 shown in FIG. 2.

The optical sensing system 30 comprises a chassis 32, two supporting arms 34 installed on the chassis 32, a wheel-shaped grid panel 40, a shaft 42 perpendicularly installed at the center of the panel 40 and rotatably installed over the two supporting arms 34 of the chassis 32, and a sensing device 38 installed on the chassis 32 for detecting rotations of the grid panel 40.

The panel 40 comprises a grid array 44 installed in it. The grid array 44 comprises a plurality of positioning holes 46 and an identification hole 48 installed around the periphery of the panel 40. The sensing device 38 is used for detecting movements of the plurality of holes 44 in left and right directions. The sensing device 38 comprises a light source 50 which is a light emitting diode, installed at one side of the panel 40, and an optical detector 52 having two sensors 54 and 56 installed at another side of the panel 40 for detecting the light emitted from the light source 50 through the holes of the grid array 44 and generating corresponding sensing signals.

The two sensors 54 and 56 of the optical detector 52 are arranged in a tilted pattern over which the sensor 56 is positioned above the other sensor 54 in up and down direction and the two sensors 54 and 56 are not overlapped in left and right direction. The shape of the identification hole 48 is made according to the tilted pattern of the two sensors 54 and 56 so that when any positioning hole 46 of the grid array 44 passes through the optical detector 52 in left or right direction, the two sensors 54 and 56 will sequentially detect the light passed through the positioning hole 46 and sequentially generate two sensing signals, and when the identification hole 48 of the grid array 44 passes through the optical detector 52, the two sensors 54 and 56 will detect the light passed through the identification hole 48 in the same time and generates two sensing signals in the same time.

The sensing signals sequentially generated by each positioning hole 46 can be used by the optical sensing system 30 to determine the amount of rotation and also the direction of the rotation. The two sensing signals generated in the same time by the identification hole 48 can be used by the optical sensing system 30 to identify the position of the panel 40.

Figure 4:
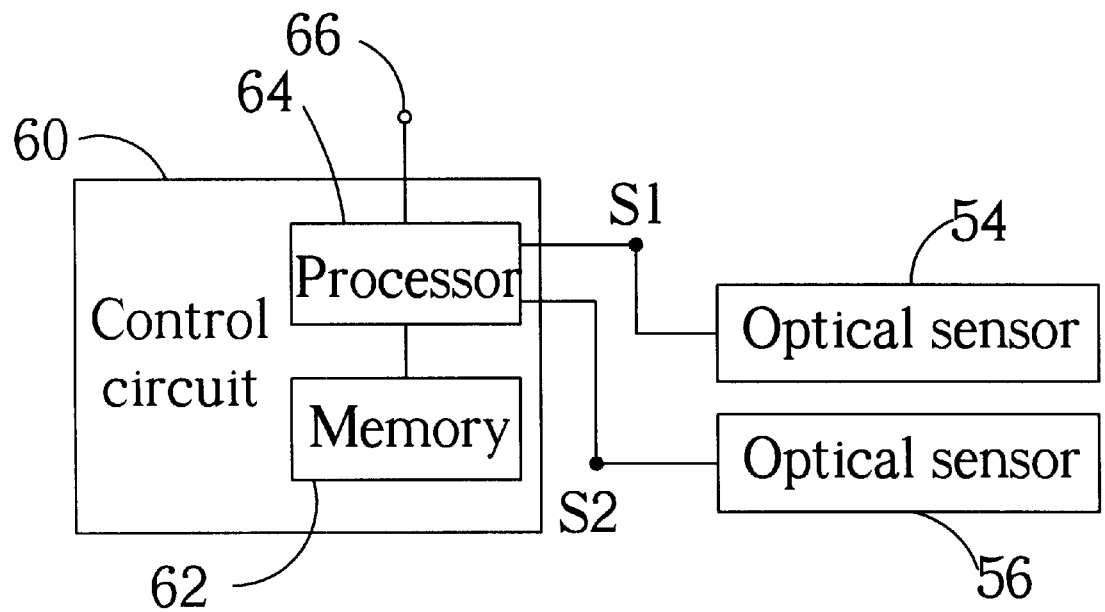
FIG. 4 is a function block diagram of the optical sensing system according to the present invention.

Please refer to FIG. 4. FIG. 4 is a function block diagram of the optical sensing system 30 according to the present invention. The optical sensing system 30 comprises two optical sensors 54 and 56, and a control circuit 60 connected to the two optical sensor 54 and 56. The control circuit 60 comprises a memory 62 for storing a position of the grid panel 40, and a processor 64 for determining displacement or position of the grid panel 40 according to the sensing signals generated by the two sensors 54 and 56, updating the position of the grid panel 40 stored in the memory 62, and generating corresponding displacement or position signals over an output port 66.

Figure 5:
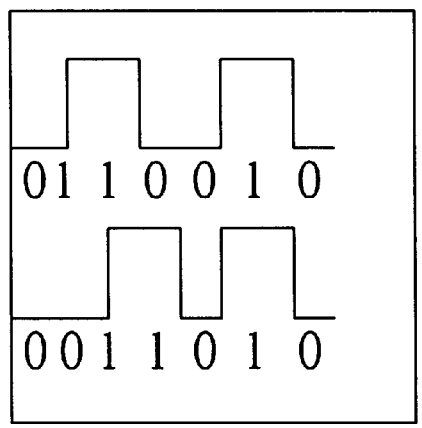
FIG. 5 is a timing diagram of the sensing device of the optical sensing system according to the present invention.

Please refer to FIG. 5. FIG. 5 is a timing diagram of the sensing signals generated by the two sensors 54 and 56 when the grid panel 40 rotates along the direction pointed by the arrow 68. Each logic one represents that the light emitted from the light source 50 is detected by a sensor, and each logic zero represents that no light is detected.

The first five pairs of the sensing signals (00→10→11→01→00) in FIG. 5 represent the signal pattern generated by the sensors 54 and 56 when a positioning hole 46 passes through the two sensors 54 and 56 in a counterclockwise direction. If a positioning hole 46 passes through the two sensors 54 and 56 in a clockwise direction, the signal pattern generated by the sensors 54 and 56 will be (00→01→11→10→00). The last three pairs of the sensing signals (00→11→00) in FIG. 5 represent the signal pattern generated by the sensors 54 and 56 when the identification hole 48 passes through the two sensors 54 and 56. Because the signal pattern generated by the identification hole 48 is quite different from the signal pattern generated by each positioning hole 46, the processor 64 can easily recognize the presence of the identification hole 48 according to the unique signal pattern generated by the identification hole 48. The processor 64 will calibrate the position of the panel 40 stored in the memory 62 when the identification hole 48 is detected by the processor 64.

The signal pattern generated by each positioning hole 46 will be used by the processor 64 to determine the amount and direction of the rotation and the processor 64 will update the position of the panel 40 stored in the memory 62 so that it can constantly reflect the current position of the panel 40. The position signals exported at the output port 66 are generated by the control circuit 60 according to the position stored in the memory 62. Likewise, if displacement signals are to be generated at the output port 66, the signal patterns generated by the holes of the grid array 44 can be used by the processor 64 to determine the amount and direction of each rotation and generate the displacement signals accordingly.

Those skilled in the art will readily observe that numerous modifications and alternations of the device may be made while retaining the teachings of the invention. Accordingly, the above disclosure should be constructed as limited only by the metes and bounds of the appended claims.

What is claimed is:

1. An optical sensing system comprising:

a grid panel having a grid array installed in it, the grid array comprising a plurality of positioning holes and an identification hole;

a sensing device for detecting movements of the grid array in left and right directions, the sensing device comprising a light source located at one side of the panel for emitting light, and two sensors located at another side of the panel for detecting the light emitted from the light source through any hole of the grid array and generating corresponding sensing signals; and a control circuit connected to the two sensors for converting the sensing signals generated by the two sensors into corresponding position signals or displacement signals;

wherein the two sensors of the sensing device are arranged in a tilted pattern over which one sensor is positioned above the other in up and down direction and the two sensors do not overlap in left and right direction, and the shape of the identification hole is made according to the tilted pattern of the two sensors so that when any positioning hole of the grid array passes through the sensing device in left or right direction, the two sensors will sequentially detect the light passed through the positioning hole, and when the identification hole of the grid array passes through the sensing device, the two sensors will simultaneously detect the light passed through the identification hole.

2. The optical sensing system of claim 1 wherein the panel is in a wheel shape, and the holes of the grid array are installed around the periphery of the panel.

3. The optical sensing system of claim 2 further comprising a chassis wherein the panel further comprises a shaft perpendicularly installed at the center of the wheel-shaped panel which is rotatably installed in the chassis, and wherein the light source and the two sensors of the sensing device are installed in the chassis and positioned at both sides of the panel for detecting rotations of the panel.

4. The optical sensing system of claim 1 wherein the control circuit comprises:

a memory for storing a position of the panel; and a processor for updating the position according to the sensing signals generated by the two sensors; wherein the processor will calibrate the position when the identification hole is detected by the processor according to the sensing signals generated by the identification hole.

5. The optical sensing system of claim 4 wherein when any of the positioning holes passes through the sensing device, the two sensors will sequentially detect the light emitted through the positioning hole and sequentially generate corresponding sensing signals, and the processor will update the position according to the sensing signals generated by the positioning hole.

6. The optical sensing system of claim 5 wherein the position signals generated by the control circuit are generated according to the position stored in the memory.

7. The optical sensing system of claim 5 wherein the displacement signals generated by the control circuit are generated according to the sensing signals generated by any hole of the grid array.

* * * * *